United States Patent
Koch

(10) Patent No.: US 8,627,964 B2
(45) Date of Patent: Jan. 14, 2014

(54) FILTER DEVICE FOR FILTRATION OF A FLUID

(75) Inventor: Eugen Koch, Schömberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 239 days.

(21) Appl. No.: 12/753,352

(22) Filed: Apr. 2, 2010

(65) Prior Publication Data

US 2011/0094958 A1   Apr. 28, 2011

(30) Foreign Application Priority Data

Apr. 2, 2009 (DE) .......................... 10 2009 015 631

(51) Int. Cl.
*B01D 27/06* (2006.01)
*B01D 35/00* (2006.01)

(52) U.S. Cl.
USPC ............... 210/493.5; 210/497.1; 210/493.4; 210/205; 210/209

(58) Field of Classification Search
USPC ......... 210/493.5, 497.1, 493.4, 205, 206, 209
See application file for complete search history.

(56) References Cited

U.S. PATENT DOCUMENTS

| | | | |
|---|---|---|---|
| 2,785,805 A | | 3/1957 | Hough |
| 4,144,166 A | * | 3/1979 | DeJovine ................. 508/117 |
| 5,552,040 A | | 9/1996 | Baehler |
| 2005/0173325 A1 | * | 8/2005 | Klein et al. ............... 210/206 |
| 2007/0277488 A1 | * | 12/2007 | Eisengraeber-Pabst et al. ..................... 55/521 |

FOREIGN PATENT DOCUMENTS

| EP | 1555059 | 7/2005 |
|---|---|---|
| EP | 1568404 | 8/2005 |

OTHER PUBLICATIONS

German patent office search for priority application: DE 10 2009 015 631.3-13.
EP Search report: EP10153061, Mar. 26, 2010.

* cited by examiner

*Primary Examiner* — Benjamin Kurtz
*Assistant Examiner* — Madeline Gonzalez
(74) *Attorney, Agent, or Firm* — James Hasselbeck

(57) ABSTRACT

A filter device for filtration of fluid has a filter element of a zigzag-folded filter medium that is flowed through in a radial direction of the filter element. An additive for functional change of fluid properties of the fluid to be filtered in the filter device is provided. The additive is applied circumferentially on the filter element onto outwardly positioned fold tips of the zigzag-folded filter medium of the filter element.

5 Claims, 2 Drawing Sheets

FILTER DEVICE FOR FILTRATION OF A FLUID

CROSS REFERENCE TO RELATED APPLICATIONS

This application claims the benefit under 35 USC 119 of foreign application DE 10 2009 015 631.3-13 filed in Germany on Apr. 2, 2009, and which is hereby incorporated by reference in its entirety.

TECHNICAL FIELD

The invention relates to a filter device for filtration of a fluid that comprises a filter element flowed through radially and comprised of a zigzag-folded filter medium on which is arranged an additive for functional change of the fluid properties.

BACKGROUND OF THE INVENTION

EP 1 555 059 A1 discloses a liquid filter for internal combustion engines that is embodied as an additive filter and is provided with an additive that, when the filter element is flowed through, releases active ingredients into the fluid. The active ingredients are designed to functionally improve the properties of the fluid. One embodiment of this reference shows a cylindrical filter element that is comprised of a zigzag-folded filter medium in a cylindrical arrangement wherein an additive has been introduced into some of the folds of the filter element that are open in a radial outward direction. The filter element is flowed through by the liquid to be purified in radial direction from the exterior to the interior so that the exterior side is the raw side (unfiltered side) and the liquid is brought into direct contact with the additive that is open toward the raw side.

SUMMARY OF THE INVENTION

It is therefore an object of the present invention to configure a filter device for filtration of a fluid with simple measures and without limitation of the filtration performance in such a way that the active ingredients of an additive can be released into the fluid flow passing through the filter element.

In accordance with the present invention, this is achieved in that the additive is applied circumferentially on the filter element onto the outwardly positioned fold tips. The dependent claims provide expedient further embodiments.

The filter device according to the present invention is preferably utilized for filtering liquids, in particular in motor vehicles or in internal combustion engines, for example, for filtering fuel, oil, cooling agent or the like. In principle, it is also possible to use the filter device for filtration of gaseous fluids, for example, filtration of intake air in an internal combustion engine or of the air to be supplied to the passenger compartment.

The filter element through which the fluid to be filtered is guided is comprised of a zigzag-folded filter medium on which an additive for functional change of the fluid properties is arranged. The additive contains chemical substances or active ingredients that are released into the fluid as the fluid flows through the filter element and that contribute to the improvement of the properties of the fluid, for example, improve the flow behavior, provide wear or corrosion protection or improve gliding properties of moving parts.

The additive is applied on the circumferential side of the filter element onto the outwardly positioned fold tips; this has the advantage that the filter performance of the filter element is not limited due to the application of the additive. The fluid flows against the fold tips so that the active ingredients of the additive can be absorbed by the fluid. Since the filtration effect of the filter element is however provided across the fold surfaces that extend between the radially outwardly positioned and the radially inwardly positioned fold tips of the zigzag-folded filter medium, the application of the additive onto the outwardly positioned fold tips does not impair the filtration effect. The fold surfaces that provide the filtration action remain basically free of additive. Since the additive as a result of its arrangement on the outer fold tips is within the flow path of the fluid, there is still an effective absorption of the additive substances by the fluid.

The zigzag-folded filter medium is preferably arranged in a cylindrical configuration and is flowed through by the fluid to be purified radially from the exterior to the interior. In the context of the invention, however, also a plate-shaped or rectangular configuration of the zigzag-folded filter medium is possible.

For example, the additive is in the form of an additive bead that extends in circumferential direction and/or in axial direction on the outer circumference of the filter element. When arranged in circumferential direction, the additive bead extends between two neighboring fold tips wherein expediently an extension across the entire outer circumference is provided in order to ensure independent of the location of incoming flow a uniform release of active ingredients into the fluid. The additive bead is either in the form of a ring that extends at a defined axial position about the circumference of the filter element. However, possible is also a spiral-shaped embodiment in which the adhesive bead extends in a spiral shape about the circumference of the filter element.

In case of an extension in axial direction the additive bead is applied onto the fold tips and extends along the fold tip of a filter fold. Possible is an application of the additive bead onto only one or a limited number of fold tips in the axial direction as well as an application onto all fold tips.

According to a further advantageous embodiment, it is provided that a reinforcement thread is wound either annularly or spirally about the circumference of the filter element wherein the additive adheres to the reinforcement thread that therefore forms a support for the additive. The additive is located in this connection in particular on the exterior side of the reinforcement thread and is therefore exposed to the direct flow of the incoming fluid. This is achieved, for example, in that the additive envelopes the reinforcement thread.

Also envisioned is an embodiment in which the additive performs the additional task of an adhesive for the adhesion of the reinforcement thread onto the circumference of the filter element. In this embodiment, no additional adhesive for attachment of the reinforcement thread on the tips of the filter fold is required.

In a further expedient embodiment it is provided that the additive is arranged exclusively on the circumference of the filter element, in particular, in the afore described way either alone as an additive bead in the axial direction or in the circumferential direction and/or in combination with a reinforcement thread. An additional arrangement of the additive along the fold surfaces between the radially outwardly positioned fold tips and the radially inwardly positioned fold tips is avoided in this embodiment. However, it may also be expedient according to a further embodiment to apply an additive additionally at least in select folds.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the Figures, same reference numerals indicate same parts.

Figure 1:
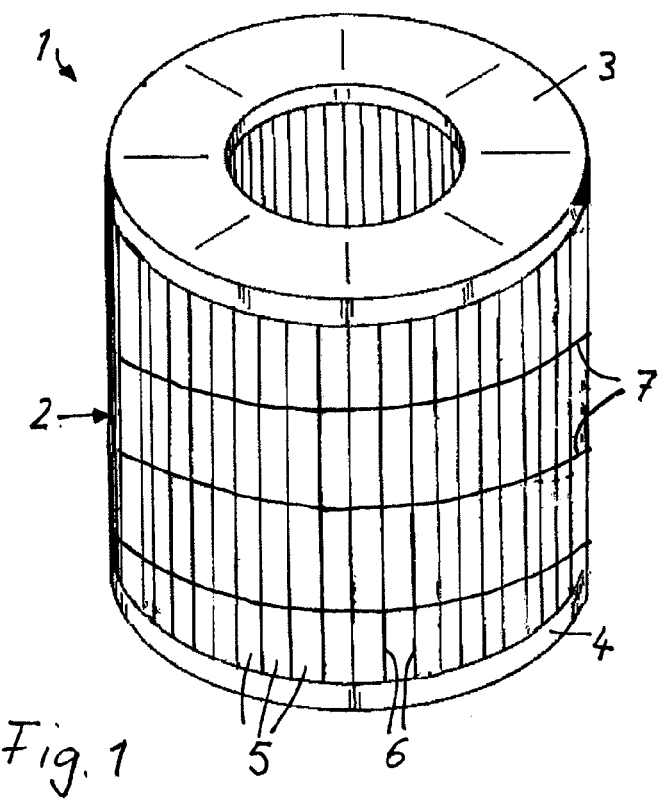
FIG. 1 is a perspective view of a cylindrical filter element with a zigzag-shaped filter medium that has wound about the outer circumference in a spiral shape a reinforcement thread wherein the reinforcement thread is provided with an additive, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter device for filtration of a fluid. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1 a hollow cylindrical filter element 1 is illustrated that is comprised of a zigzag-folded filter medium in a hollow cylindrical arrangement whose folds 5 extend at least approximately in radial direction. As a result of the zigzag-shaped folding of the filter medium 2 the outer circumference of the filter element is formed by fold tips 6 that are positioned radially outwardly wherein each fold 5 has in addition to the radially outwardly positioned fold tip 6 a radially inwardly positioned fold tip and the filter fold with a fold surface extends between the radially outwardly positioned and the radially inwardly positioned fold tips, respectively. The filter element 1 is flowed through radially from the exterior to the interior by the fluid to be filtered so that the exterior side forms the raw side (unfiltered side) and the cylindrical interior of the hollow cylindrical filter element forms the clean side (filtered side) through which the purified fluid is discharged in the axial direction.

The filter element 1 is framed in axial direction by a terminal disk 3, 4, respectively, wherein the terminal disks 3, 4 are placed immediately onto the end faces of the filter medium 2 and close the filter medium in axial direction in a flow-tight manner.

On the outer circumference of the filter element 1 a reinforcement thread 7 is arranged that is glued onto the outer circumference of the filter element 1 and extends spirally about the outer circumference. Expediently, a single continuous reinforcement thread 7 is provided wherein basically also several individual reinforcement threads are possible. Moreover, it is possible that one or a plurality of reinforcement threads 7 extend annularly along the outer circumference at different axial height.

According to the present invention, it is provided that an additive adheres to the reinforcement thread 7 which releases chemical active ingredients into the incoming fluid in order to improve the physical and/or chemical properties of the fluid. The additive may enclose the reinforcement thread completely or partially so that the reinforcement thread 7 forms the support element for the additive that is applied, for example, in the form of a gel. Moreover, it is possible that the additive forms at the same time the adhesive with which the reinforcement thread 7 is glued onto the fold tips on the outer circumference of the filter element 1. Basically, it is also possible that the adhesive with which the reinforcement thread 7 is attached is a substance separate from the additive.

Figure 2:
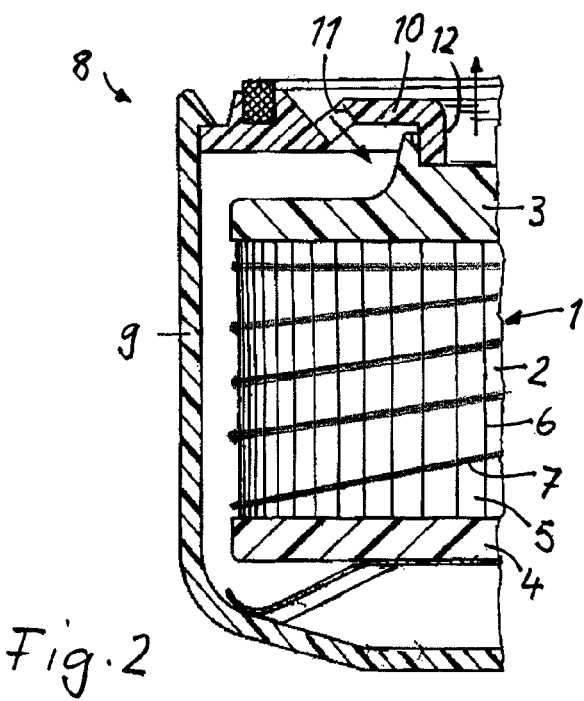
FIG. 2 shows a section of the filter device with a filter element according to FIG. 1.

In FIG. 2, the filter element 1 is illustrated in its mounted position in a filter device 8 that comprises additionally a filter housing 9 into which the filter element 1 is insertable as an exchangeable (disposable) filter insert. The filter housing 9 is to be closed off by a housing lid 10 into which an inlet opening 11 for the supply of the fluid to be purified and an outlet opening for discharging the purified fluid are provided. The fluid that is entering through the inlet opening 11 propagates in the annular space between the inner wall of the filter housing 9 and the outer circumference of the filter element 1 and passes through the filter element 1 radially from the exterior to the interior. Subsequently, the axial discharge of the purified fluid out of the cylindrical interior of the filter element is realized through the outlet opening 12 in the housing lid 10. Fixation of the filter element 1 within the filter housing 9 is realized through the terminal disks 3 and 4.

A reinforcement thread 7 is wound about the filter element 1, the afore described additive adheres to the reinforcement thread releasing its active substances gradually into the incoming fluid. The rate at which the active ingredients are transferred from the additive into the fluid depends on the different physical and chemical parameters, inter alia on the consistency of the additive that is adhering to the reinforcement thread 7 and is preferably in the form of a gel.

Figure 3:
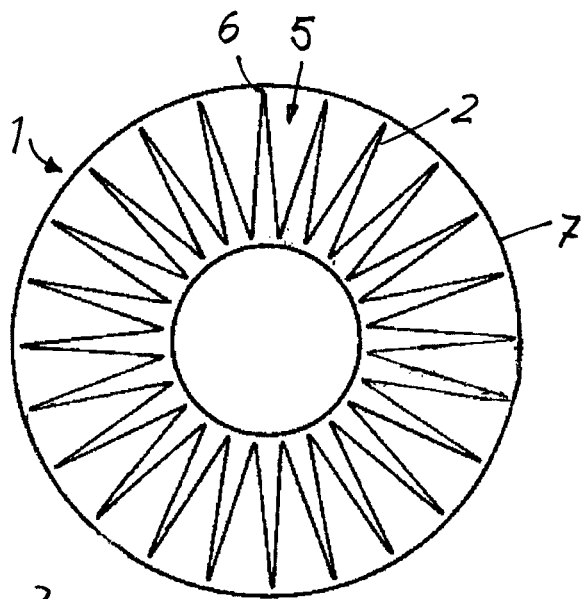
FIG. 3 is a plan view of the filter element.

As illustrated in the section view according to FIG. 3, the filter medium 2 is folded in a zigzag shape and is arranged geometrically in the form of a hollow cylinder so that a cylindrical interior is formed that represents the clean side. The reinforcement thread 7 with the additive adheres exclusively to the fold tips 6 of the individual filter folds 5. In contrast to this, within the filter folds 5 there is no additive so that the filter folds 5 can be utilized for filtration of the fluid without any limitation of the filtration action.

Figure 4:
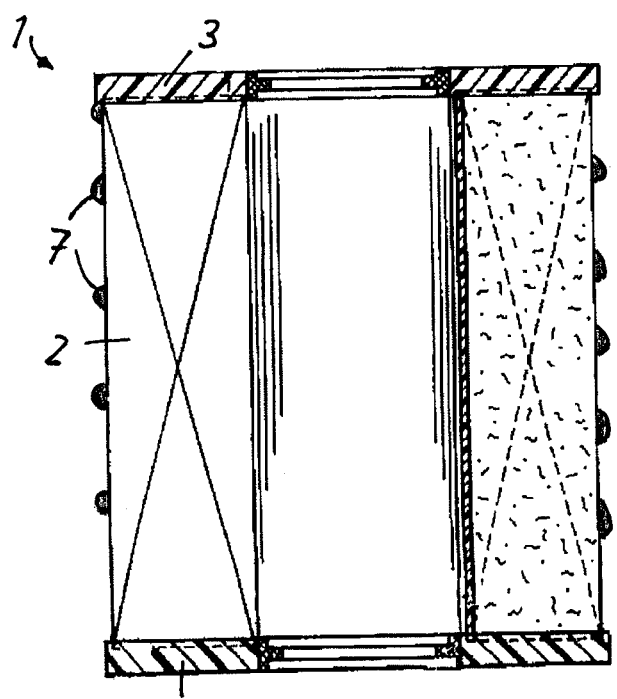
FIG. 4 is a section view of the filter element.

In longitudinal section according to FIG. 4 it can be seen that the spirally wound reinforcement thread 7 that is provided with the additive extends axially across the length of the filter element 2. Expediently, a single continuous reinforcement thread 7 is provided that is wound spirally about the outer circumference of the filter element 2 and that adheres to the fold tips.

In an alternative embodiment, the additive is applied as a bead onto the outer circumference of the filter element instead of or in addition to the reinforcement thread. In this case, reference numeral 7 refers to the additive bead on the outer circumference.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter device for filtration of fluid, comprising:
a filter element comprised of a zigzag-folded filter medium and flowed through in a radial direction of said filter element;
an additive operative to change fluid properties of the fluid to be filtered in the filter device;
a reinforcement thread;
wherein the additive forms at the same time an adhesive with which the reinforcement thread is glued onto radially outwardly positioned fold tips on the filter element,
wherein said additive extends as a bead across neighboring fold tips and around an entire outer circumference of said filter element,
wherein said additive bead encloses said reinforcement thread completely, said reinforcement thread forming a support element for said additive bead.

2. A filter device for filtration of fluid, comprising:
a filter element comprised of a zigzag-folded filter medium and flowed through in a radial direction of said filter element, said folded filter medium having a plurality of fold tips extending in an axial direction of said filter element;
an additive operative to change fluid properties of the fluid to be filtered in the filter device;
wherein the additive forms at the same time an adhesive with which reinforcement thread is glued onto radially outwardly positioned fold tips on the filter element,
wherein said additive forms a plurality of elongated axially aligned beads, each elongated additive bead adhered onto, aligned with and extending axially along a respective one of said fold tips.

3. The filter device according to claim 1, wherein said additive is arranged exclusively on a circumference of said filter element.

4. The filter device according to claim 1, wherein said zigzag-folded filter medium is arranged in a hollow cylindrical shape to form said filter element.

5. The filter device according to claim 2, wherein said zigzag-folded filter medium is arranged in a hollow cylindrical shape to form said filter element.

\* \* \* \* \*